(12) United States Patent
Baida

(10) Patent No.: US 7,373,732 B2
(45) Date of Patent: May 20, 2008

(54) ATTACHABLE GUIDE FOR A CIRCULAR SAW

(76) Inventor: Nicholas Baida, 225 NE. Oak Dale Dr., Grants Pass, OR (US) 97526

( * ) Notice: Subject to any disclaimer, the term of this patent is extended or adjusted under 35 U.S.C. 154(b) by 80 days.

(21) Appl. No.: 11/443,829

(22) Filed: May 31, 2006

(65) Prior Publication Data

US 2007/0277389 A1  Dec. 6, 2007

(51) Int. Cl.
  *B43L 7/12* (2006.01)
  *B23Q 17/22* (2006.01)

(52) U.S. Cl. ....................................................... 33/640

(58) Field of Classification Search .................. 33/640, 33/626, 628, 630, 641
See application file for complete search history.

(56) References Cited

U.S. PATENT DOCUMENTS

| 1,535,042 | A | * | 4/1925 | Sadler .......................... 83/745 |
| 4,299,034 | A | * | 11/1981 | DeBetta ....................... 33/630 |
| 4,335,512 | A | | 6/1982 | Sheps et al. |
| 4,607,434 | A | * | 8/1986 | Francis .......................... 33/42 |
| 4,751,865 | A | | 6/1988 | Buckalew |
| 4,790,072 | A | | 12/1988 | Edwards |
| 4,843,728 | A | | 7/1989 | Francis |
| 4,945,799 | A | | 8/1990 | Knetzer |
| 6,079,309 | A | | 6/2000 | Molburg |
| 6,584,698 | B1 | | 7/2003 | Liu |
| 6,604,296 | B2 | * | 8/2003 | Mastrobattista .............. 33/640 |
| 6,708,422 | B1 | | 3/2004 | Stojanovski |
| 6,725,558 | B2 | * | 4/2004 | Gommper et al. ............ 33/640 |
| 6,757,984 | B2 | * | 7/2004 | Harris ......................... 33/494 |
| 6,763,754 | B1 | * | 7/2004 | Glenn .......................... 83/745 |
| 7,162,809 | B2 | * | 1/2007 | Haas et al. ................... 33/640 |

* cited by examiner

*Primary Examiner*—Christopher W Fulton
(74) *Attorney, Agent, or Firm*—Dale J. Ream

(57) ABSTRACT

A guide for attachment to a circular saw includes an attaching member, an extension member for slidable movement in a slot defined longitudinally along the attaching member, and an angle guide attached to the extension member. The attaching member is attachable to a circular saw rip guide and includes primary and rear portions for abutting a workpiece. The angle guide may be set to a desired angle and locked into place. With the angle guide pressed against the workpiece, the circular saw may be activated. As the saw and attached guide move forward along a cut path, the extension member and angle gauge remain abutted against the workpiece through relative slidable movement between the attaching and extension members. A ball catch mechanism may be included to selectively prevent the attaching and extension members from completely separating. A laser light may also be included to illuminate the line to be cut.

17 Claims, 9 Drawing Sheets

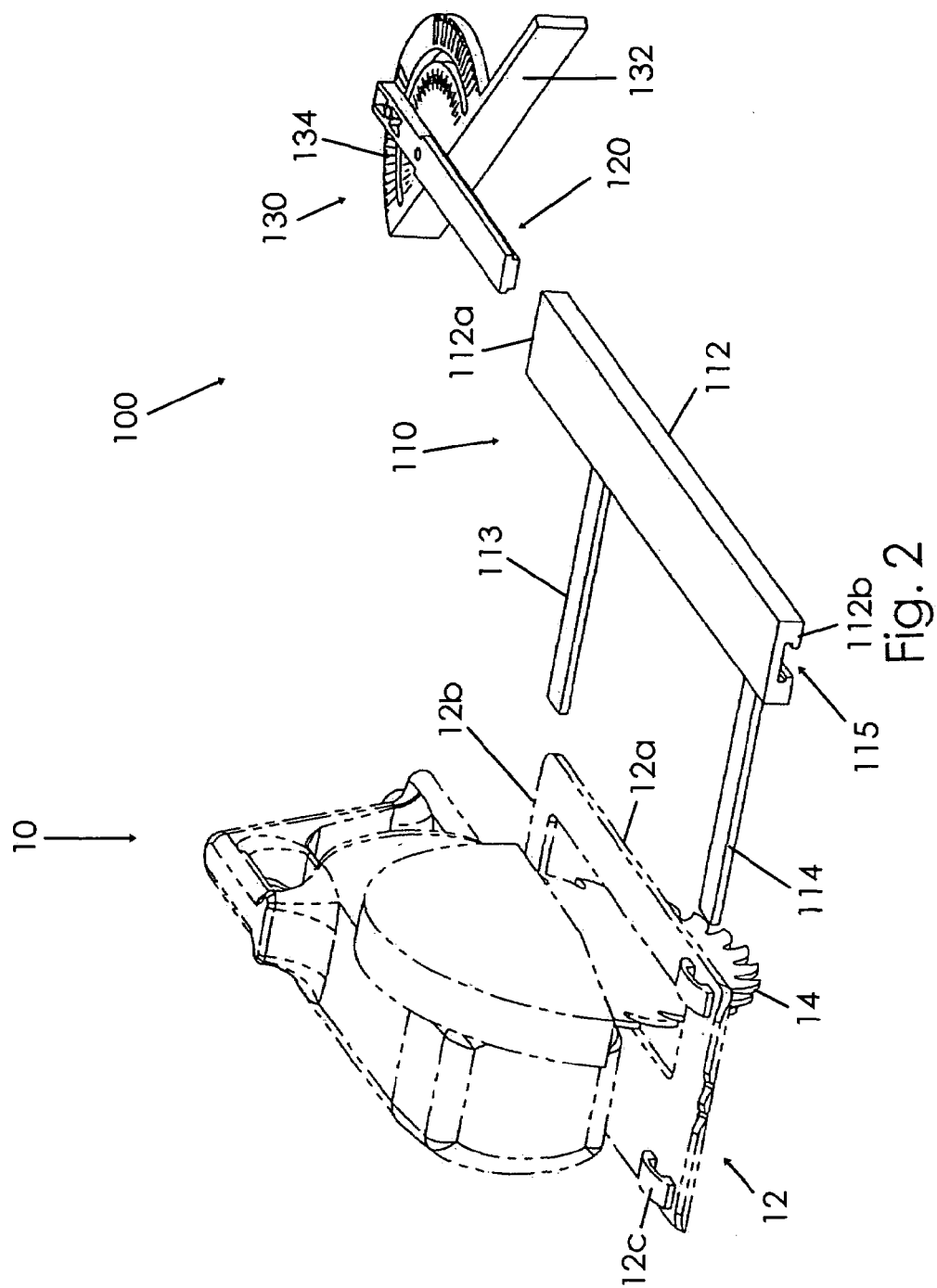

ATTACHABLE GUIDE FOR A CIRCULAR SAW

BACKGROUND OF THE INVENTION

This invention relates generally to carpentry tools and, more particularly, to a guide for attachment to a circular saw that simplifies laying out and cutting angles with a circular saw.

A frequent task for a carpenter is to lay out angles on a workpiece such as a board and then to cut the piece along that angle. Laying out and marking the angles can be a very time consuming process that may require several steps. For instance, a carpenter may use a speed square or other angle-measuring device and then mark the angle with a pencil. Then the workpiece is taken to a saw or the saw, such as a circular saw, is brought to the workpiece where a cut is made. Of course, the accuracy of the cut is dependent upon the accuracy of the angle measurement and marking.

Various devices have been proposed in the art for combining an angle measurement tool with a circular saw. Although assumably effective for their intended purposes, there is still a need for an angle-measurement cutting tool that is nearly universal for use with most circular saws and includes additional features needed by carpenters.

Therefore, it would be desirable to have a guide for attachment to a circular saw for quickly measuring an angle and then guiding a carpenter to cut accurately at the measured angle. Further, it would be desirable to have such an guide that is easily attached to most circular saws and that includes a miter gauge that slides along a slot as the cut is made. In addition, it would be desirable to have a attachable guide that can prevent the miter gauge from sliding totally out of the guide. A guide having a selectively actuated laser that shows the path to cut would also be desirable.

SUMMARY OF THE INVENTION

Accordingly, an attachable guide for a circular saw according to the present invention is shown in FIGS. 1 to 9b. The guide includes an attaching member for being selectively coupled to the shoe of a circular saw and an extension member for relative movement along the attaching member. The attaching member includes a primary portion that abuts the side of the circular saw show, a rear portion that abuts the rear surface of the shoe, and a front portion that is removably receivable in the rip guide slot. The attaching member defines a slot extending longitudinally therealong through which the extension member may slide during operation. An angle gauge is rotatably coupled to an end of the extension member and includes a vertical sidewall for placement against a workpiece.

In operation, the attaching member may be coupled to a circular saw and the angle gauge may be placed against a workpiece and a desired angle for cutting may be determined thereby. The circular saw may then be actuated to begin cutting the workpiece according to the angle set by the angle gauge. As the cutting operation proceeds, the extension member and angle gauge slide rearwardly along the slot of the attaching member. In actuality, the extension member and angle gauge stay fixed at the workpiece while the saw and attaching member move forward along an advancing cut line.

According to another aspect of the invention, the attachable guide may include a ball catch mechanism for regulating the amount of movement between the attaching and extension members. More particularly, a spring-loaded ball may be inserted through a hole in the attaching member and reside in a complementary channel defined by the extension member. However, when the ball encounters an end of the channel, it prevents further travel of the extension member, e.g. so as to prevent a complete separation of the extension and attaching members.

According to still another aspect of the invention, the attachable guide may include a laser mounted so as to display a line through which the circular saw's blade will travel. Another ball catch mechanism may be mounted near the front of the attaching member and positioned so as to actuate the laser light upon contact with a raised portion of the extension member. The point on the extension member which actuates the ball and switch would correspond to when the attachable guide is configured to begin a cutting operation. The laser light circuitry may be configured to turn off the laser light according to a timer or upon some other condition.

Therefore, a general object of this invention is to provide a guide for attachment to a circular saw for simplifying a carpenter's task of measuring, marking, and guiding the cutting of an angle in a workpiece.

Another object of this invention is to provide a tool, as aforesaid, which attaches easily and securely to a circular saw.

Still another object of this invention is to provide a guide, as aforesaid, having a angle measuring gauge for determining an angle and that can be locked in place during subsequent cutting operations.

Yet another object of this invention is to provide a guide, as aforesaid, in which the angle gauge slides rearwardly through a slotted member during a cutting operation.

A further object of this invention is to provide a guide, as aforesaid, having a ball catch for selectively preventing the miter gauge from completely sliding out of the slotted member.

A still further of this invention is to provide a guide, as aforesaid, having a laser light that is automatically actuated when the miter gauge is in position to guide a cutting operation.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2 is an exploded view of the attachable guide as in FIG. 1;

FIG. 4a is a perspective view of the attachable guide according to another embodiment of the present invention;

FIG. 4b is a top view of an attachable guide as in FIG. 4a;

FIG. 8b is a sectional view taken along line 8b-8b of FIG. 8a;

DESCRIPTION OF THE PREFERRED EMBODIMENT

An attachable guide 100 for a circular saw 10 according to the present invention will now be described in detail with reference to FIGS. 1 through 9b of the accompanying drawings. More particularly, an attachable guide 100 according to the current invention includes an attaching member 110 and an extension member 120.

Figure 1:
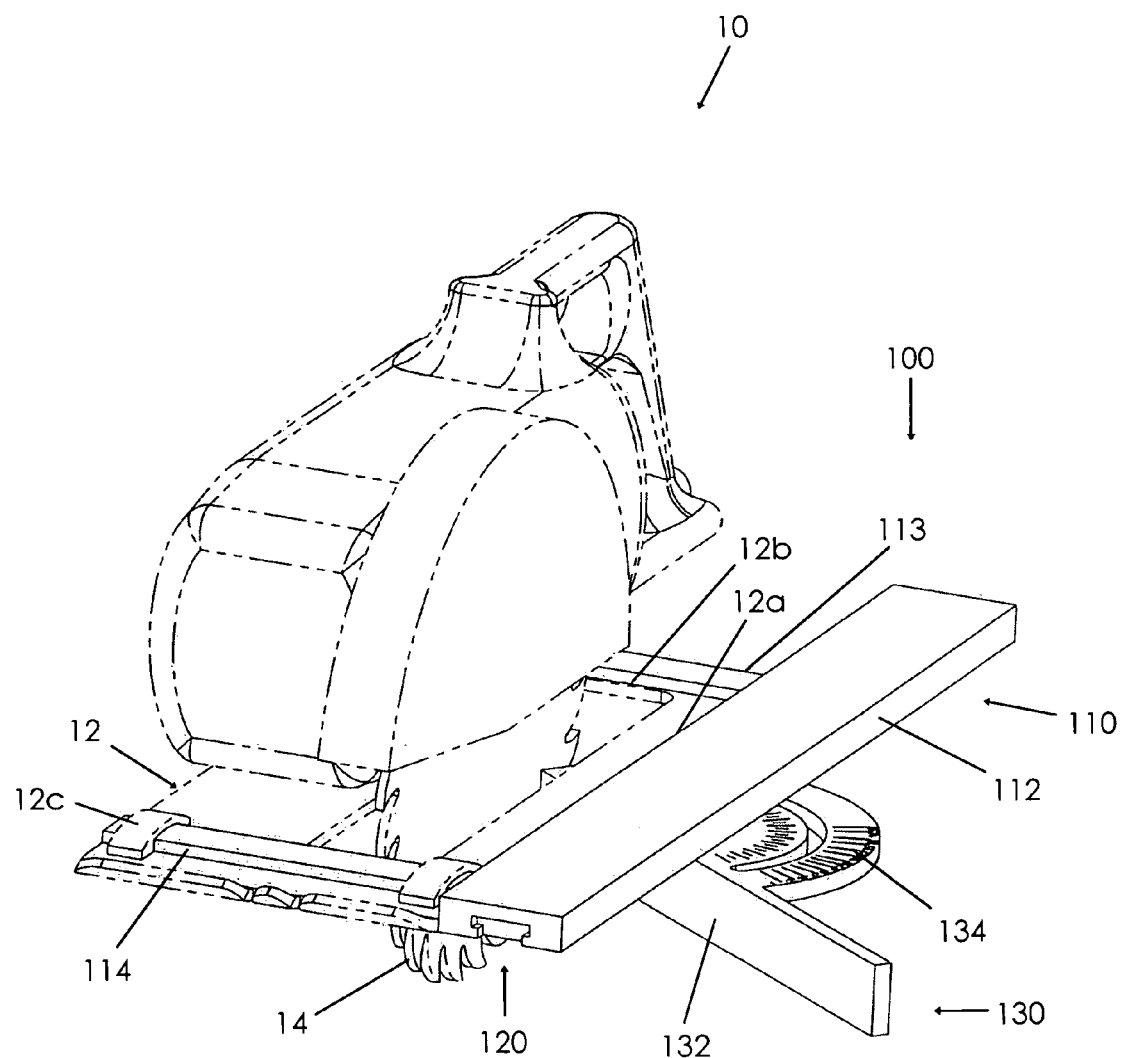
FIG. 1 is a perspective view of an attachable guide for a circular saw according to one embodiment of the present invention.

As shown in FIG. 1, the attaching member 110 may be selectively coupled to a shoe 12 of the circular saw 10. The attaching member 110 may have a primary portion 112 for abutting a side 12a of the shoe 12 and means for coupling the primary portion 112 to the shoe 12. More particularly, the attaching member 110 may have a rear portion 113 for abutting a rear surface 12b of the shoe 12 and a front portion 114 receivable in the shoe's rip guide slot 12c. The attaching member primary portion 112 has first and second ends 112a, 112b and defines a slot 115 extending from the first end 112a toward the second end 112b. The slot 115 is shown extending to the second end 112b throughout the drawings.

Figures 3A, 3B, 3C:
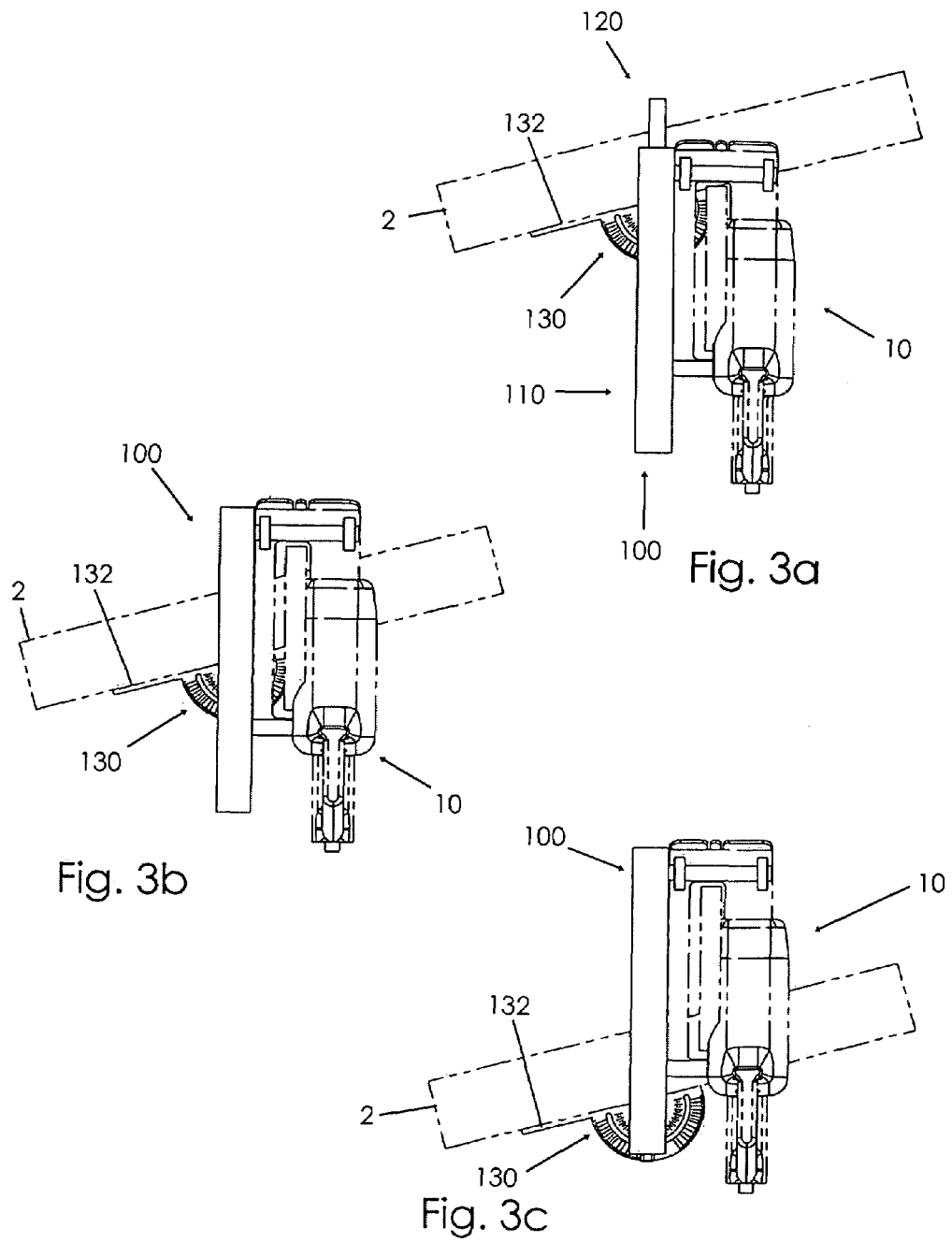
FIGS. 3a to 3c are top views of the attachable guide as in FIG. 1 showing the guide in start, partial cut, and finished configurations, respectively.
Figures 4A, 4B:
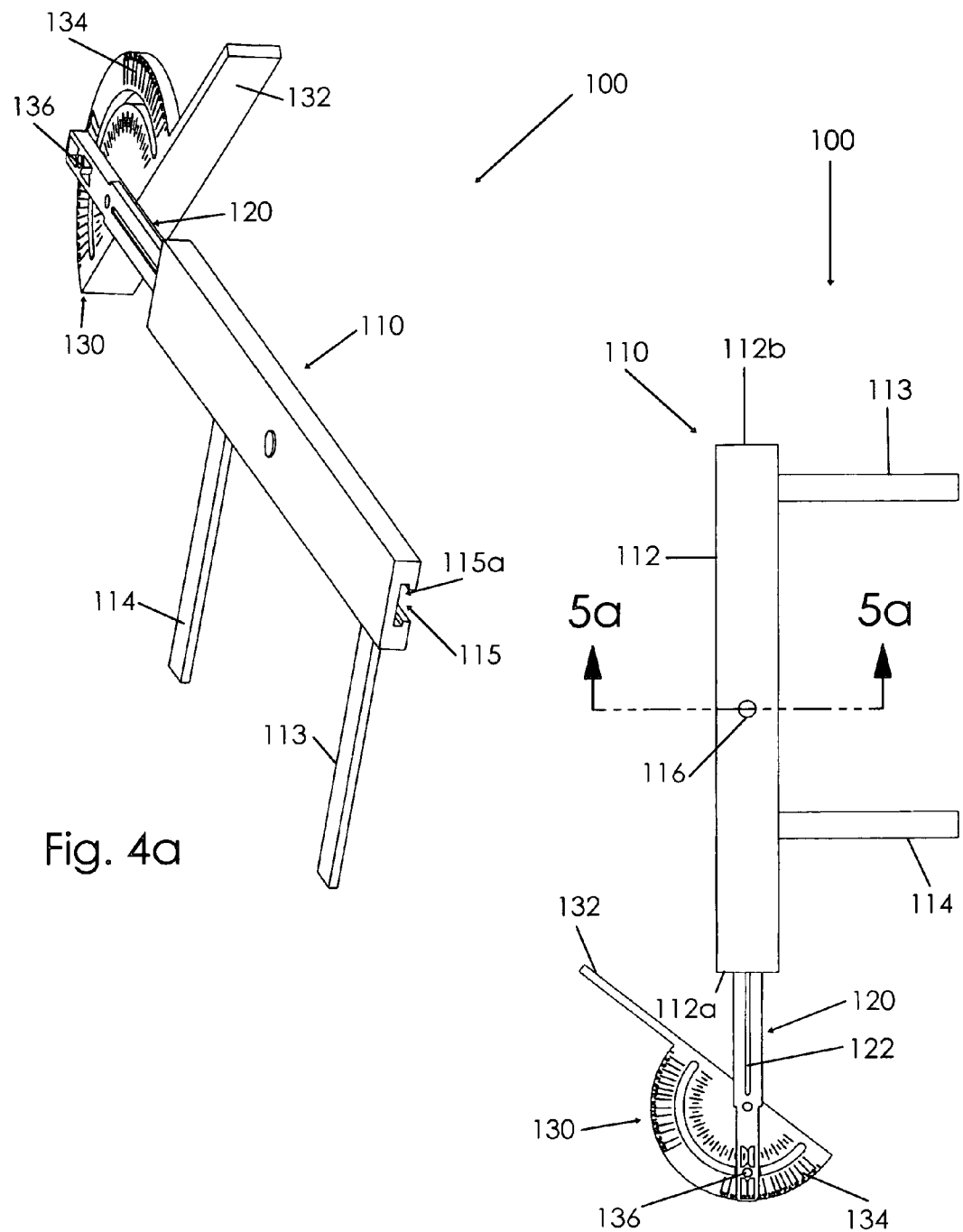
Figure 5A:
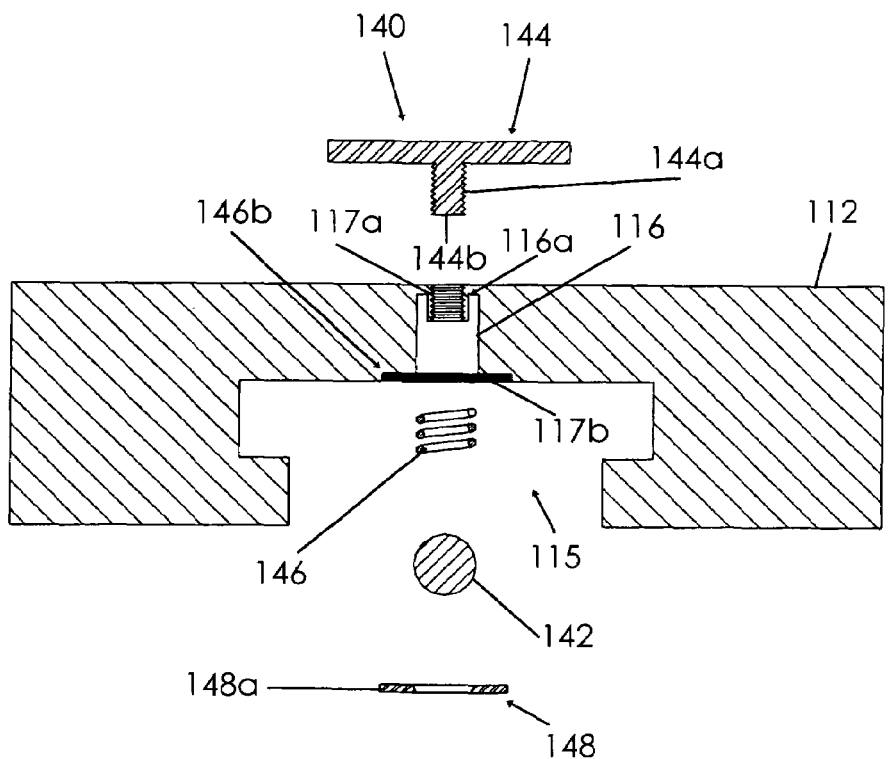
FIG. 5a is an exploded sectional view taken along line 5a-5a of FIG. 4b.
Figure 5B:
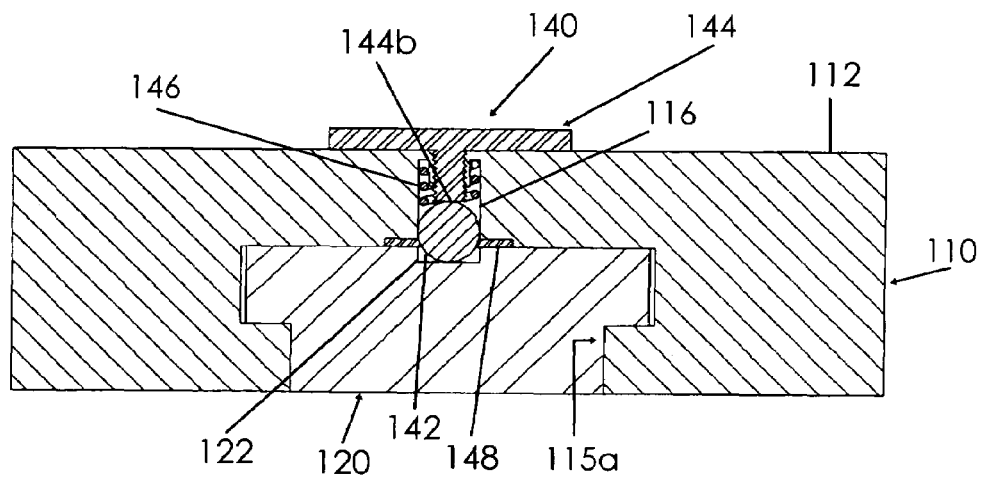
FIG. 5b is another sectional view as in FIG. 5a with a screw being in a tightened configuration and a ball being situated in an extension member channel.
Figure 6A:
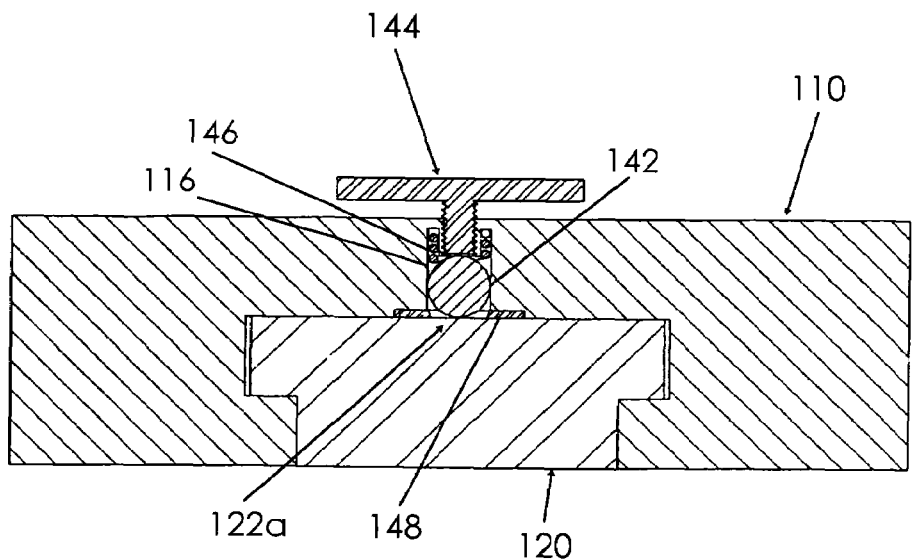
FIG. 6a is another sectional view as in FIG. 5b with a screw in a loosened configuration for allowing attaching and extension members to slide relative to one another over portions of the extension member not defining a channel.
Figure 6B:
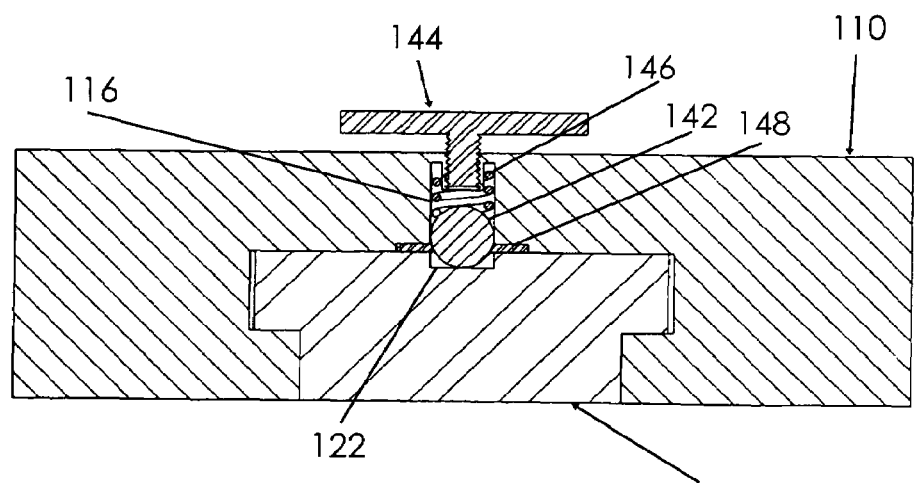
FIG. 6b is another sectional view as in FIG. 5b with a screw in a loosened configuration with the ball positioned in the extension member channel.

The extension member 120 is slidably coupled to the primary portion 112 of the attaching member 110. For example, the extension member 120 may be received in the attaching member slot 115. The attaching member slot 115 may have a throat region 115a through which the extension member 120 may not pass to couple the attaching member 110 to the extension member 120 (FIG. 5b). The extension member 120 may be rotatably coupled to an angle gauge 130 that has a vertical sidewall 132 for placement against a workpiece 2 (FIGS. 3a through 3c). As shown in FIGS. 4a and 4b, the angle gauge 130 may include indicia 134 corresponding to an angle between the angle gauge vertical sidewall 132 and the extension member 120, and the angle gauge 132 may include means (such as lock 136) for selectively maintaining a predetermined angle between the angle gauge vertical sidewall 132 and the extension member 120.

An attachable guide is shown in FIGS. 4a through 5b according to another embodiment of the present invention having a construction substantially similar to that first described except as specifically noted below. This embodiment includes a ball catch mechanism 140 that may be incorporated to limit the amount of travel between the attaching member 110 and the extension member 120 or to fulfill other needs. The extension member 120 may have an upper surface that defines a linear channel 122, and the attaching member primary portion 112 may define a hole 116 above the linear channel 122 when the extension member 120 is received in the attaching member slot 115. A ball 142 may be positioned to extend into the hole 116 and the linear channel 122, as shown in FIG. 5b. The hole 116 may extend through the attaching member primary portion 112, and an upper portion 116a of the hole 116 may include threads 117a. A screw 144 may be receivable in the hole 116, and the screw 144 may have threads 144a complementary to the hole threads 117a in the upper portion 116a to couple the screw 144 to the attaching member primary portion 112. The screw 144 includes a lower end 144b for abutting the ball 142, as shown in FIG. 5b. A spring 146 may be positioned in the hole 116 to bias the ball 142 into the extension member linear channel 122, and a retaining washer 148 may be received in the hole 116 to secure the ball 142 in the hole 116. A lower portion 116b of the hole 116 may include threads 117b, and the retaining washer 148 may have threads 148a complementary to the hole threads 117b to couple the retaining washer 148 and the attaching member primary portion 112. Notably, the retaining washer 148 does not restrict the ball 142 from extending into the extension member linear channel 122 (FIG. 5b).

Figure 7:
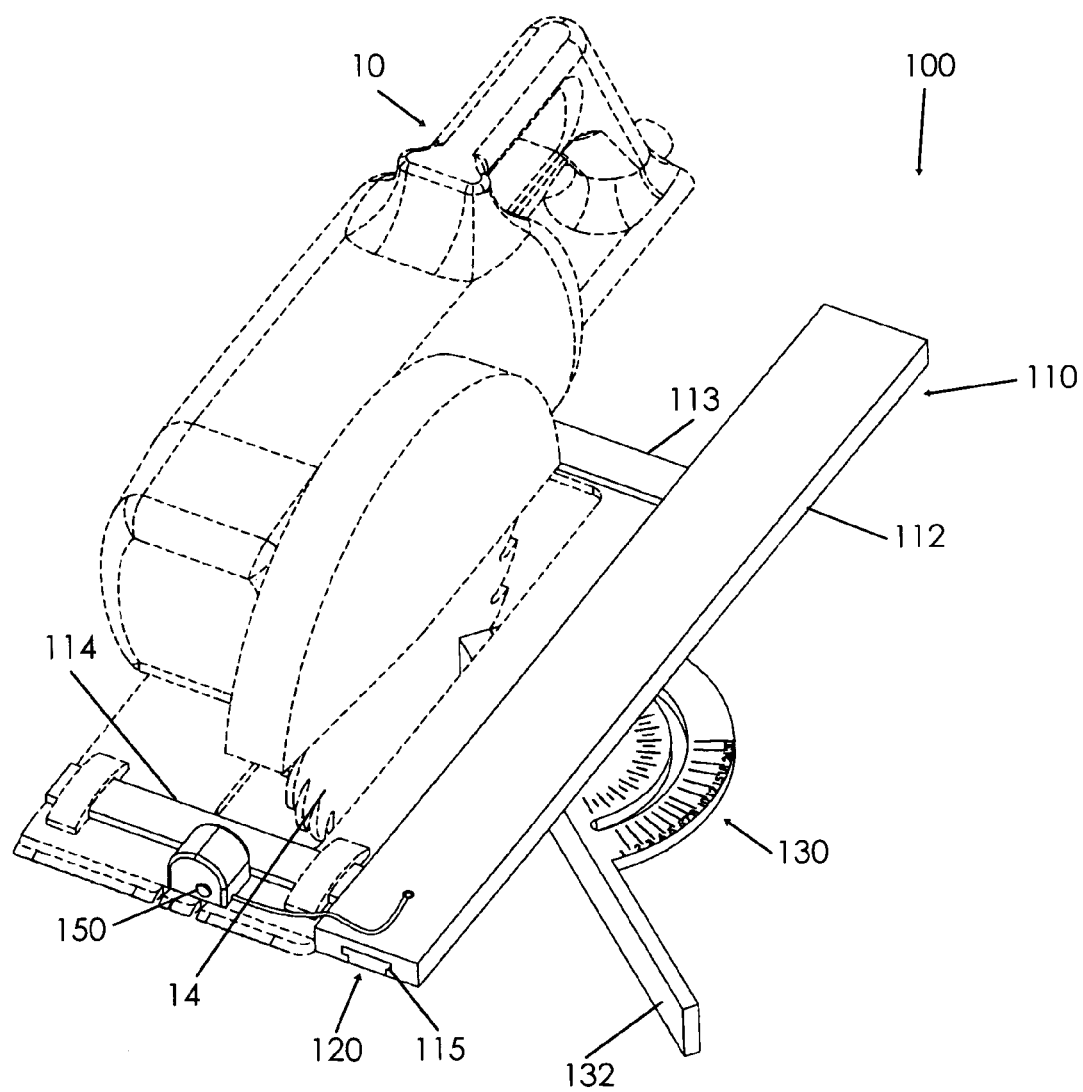
FIG. 7 is a perspective view of an attachable guide coupled to a circular saw according to still another embodiment of the present invention.
Figure 8A:
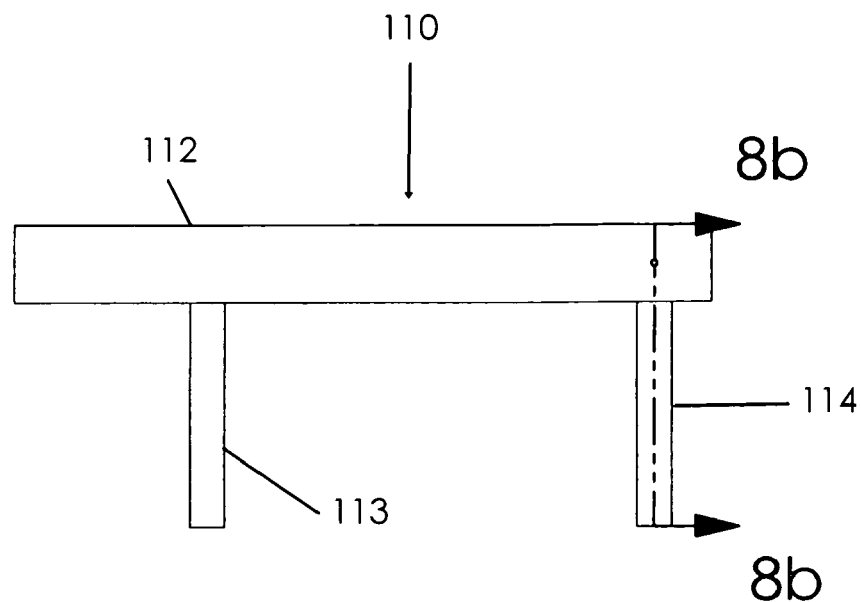
FIG. 8a is a top view of the attachable guide as in FIG. 7.
Figure 8B:
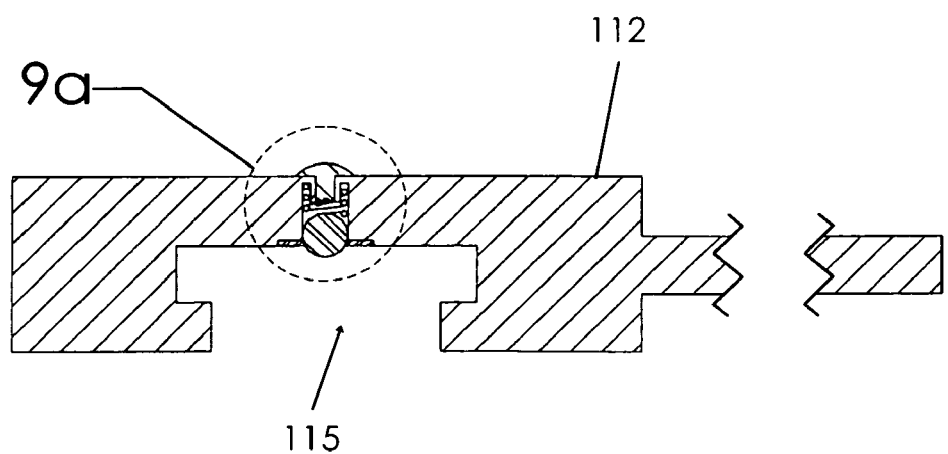
Figure 9A:
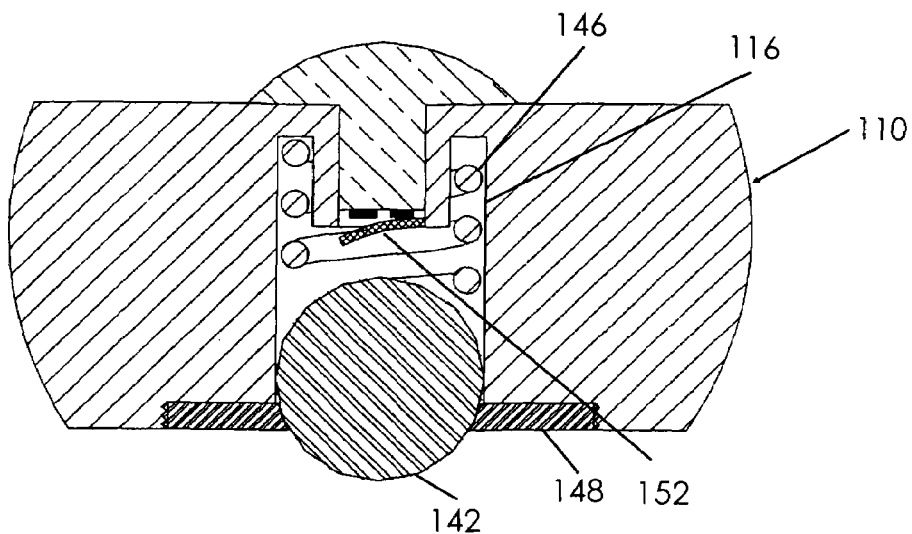
FIG. 9a is an enlarged view of a ball catch mechanism as shown in FIG. 8b.
Figure 9B:
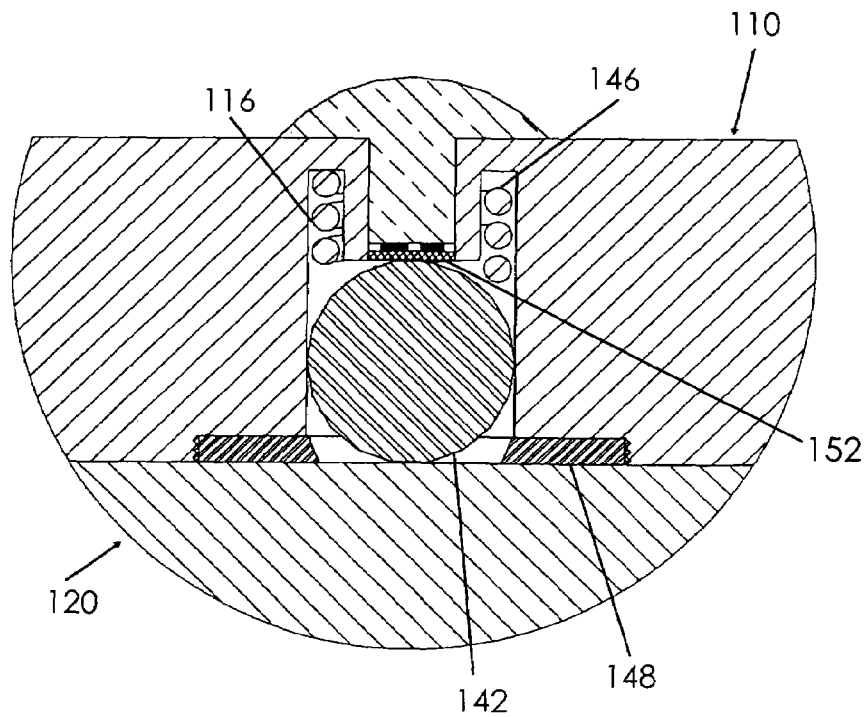
FIG. 9b is another view as in FIG. 9a showing the ball and laser switch being actuated by contact with a predetermined point on the extension member.

Another embodiment of the attachable guide is shown in FIG. 7 to 9b. The construction of this embodiment is substantially similar to the embodiment shown in FIGS. 4a to 5b, except as specifically noted below. Most notably, this embodiment shows that the ball catch mechanism 140 is positioned substantially adjacent a front end of the primary portion 112 of the attaching member 110. According to this embodiment, a laser 150 may be coupled to the attaching member 110, as shown in FIG. 7, to display a line through which the circular saw's blade 14 will travel, and a switch 152 (FIGS. 8b through 9b) may be in communication with the laser 150 to selectively actuate the laser 150 (e.g., by allowing power to reach the laser 150). The switch 152 may be selectively activated by the ball 142. For example, the linear channel 122 may have a raised area 122a that forces the ball 142 upwardly (like that shown in FIG. 6a), which in turn causes the ball 142 to contact the switch 152 (FIG. 9b). The switch 152 may be associated with a timer to deactivate the laser 150, or the switch 152 may deactivate the laser 150 after the ball 142 passes the raised area 122a of the linear channel 122 (FIG. 9a).

It should be understood that the raised portion 122a that would contact the ball 142 would be configured to do so when the attaching 110 and extension 120 members and angle guide 130 are positioned to start a cut (FIG. 3a). The circuitry of the switch 152 and laser 150 would be configured or integrated with a timer to deactivate the laser 150 after a predetermined time or upon some other condition. It should also be appreciated that the aforementioned embodiments may be incorporated together in a single embodiment through the use of independent ball catch mechanisms.

In use, the attaching member 110 may be coupled to the shoe 12 of the circular saw 10. For example, the rear portion 113 may abut the shoe's rear surface 12b and the front portion 114 may be received in the shoe's rip guide slot 12c. The extension member 120 may be received in the attaching member slot 115, and the lock 136 (FIGS. 4a and 4b) may maintain a predetermined angle between the angle gauge vertical sidewall 132 and the extension member 120. If the ball catch mechanism is incorporated, the screw 144 may be unscrewed to allow the ball 142 to pass over an end of the extension member 120 that does not define the linear channel 122 (FIG. 6a); once the ball 142 reaches the channel 122 (FIG. 6b), the screw 144 may be tightened (FIG. 5b). The vertical sidewall 132 may be placed against a workpiece 2 (FIG. 3a), the saw 10 may be actuated so that the blade 14 rotates, and the saw 10 may be moved forward. As the saw 10 moves forward, the attaching member primary portion 112 travels along the extension member 120 to ensure that the saw 10 moves in a linear direction (FIGS. 3b and 3c). The ball catch mechanism 140 may limit the relative amount of travel between the attaching member 110 and the extension member 120 (e.g., travel is limited to the length of the linear channel 122), operatively couple the attaching member 110 and the extension member 120, and/or actuate the laser 150 as discussed above.

It is understood that while certain forms of this invention have been illustrated and described, it is not limited thereto except insofar as such limitations are included in the following claims and allowable functional equivalents thereof.

What is claimed is as follows:

1. An attachable guide for a circular saw, said guide comprising:
   an attaching member for being selectively coupled to a shoe of the circular saw;
   an extension member slidably coupled to said attaching member;
   an angle gauge rotatably coupled to said extension member, said angle gauge having a vertical sidewall for placement against a workpiece;
   wherein:
      the shoe has a side, rear surface, and a rip guide slot; and
      said attaching member has a primary portion for abutting the side of the shoe, a rear portion for abutting the rear surface of the shoe, and a front portion receivable in the rip guide slot.

2. The guide of claim 1, wherein:
   said attaching member primary portion includes first and second ends and defines a slot extending from said first end toward said second end; and
   said extension member is receivable in said attaching member slot.

3. The guide of claim 2, wherein said angle gauge includes indicia corresponding to an angle between said angle gauge vertical sidewall and said extension member.

4. The guide of claim 2, further comprising means for selectively maintaining a predetermined angle between said angle gauge vertical sidewall and said extension member.

5. The guide of claim 2, wherein said attaching member slot has a throat region through which said extension member may not pass to couple said attaching member to said extension member.

6. The guide of claim 2, wherein:
   said extension member has an upper surface defining a linear channel;
   said attaching member primary portion defines a hole above said extension member linear channel when said extension member is received in said attaching member slot; and
   a ball is positioned to extend into said hole of said attaching member primary portion and said extension member linear channel.

7. The guide of claim 6, wherein:
   said hole extends through said attaching member primary portion and includes threads; and
   a screw is receivable in said hole, said screw having threads complementary to said hole threads and having a lower end for abutting said ball.

8. The guide of claim 6, further comprising a spring in said hole to bias said ball into said extension member linear channel.

9. The guide of claim 6, further comprising:
   a laser; and
   a switch in communication with said laser, said switch being selectively activated by said ball.

10. The guide of claim 6, wherein:
    a lower portion of said hole includes threads;
    a retaining washer is receivable in said hole, said retaining washer having threads complementary to said hole threads and securing said ball in said hole;
    said ball extends into said extension member linear channel.

11. The guide of claim 10, wherein:
    said hole extends through said attaching member primary portion;
    an upper portion of said hole includes threads;
    a screw is receivable in said hole;
    said screw has threads complementary to said hole threads in said upper portion;
    said screw has a lower end for abutting said ball; and
    a spring is in said hole to bias said ball into said extension member linear channel.

12. The guide of claim 11, further comprising:
    a laser; and
    a switch in communication with said laser, said switch being selectively activated by said ball.

13. An attachable guide for a circular saw, said guide comprising:
    an attaching member for being selectively coupled to a shoe of the circular saw, said attaching member having a primary portion for abutting a side of the shoe and means for coupling said primary portion to the shoe;
    an extension member slidably coupled to said attaching member primary portion;
    an angle gauge rotatably coupled to said extension member, said angle gauge having a vertical sidewall for placement against a workpiece;
    wherein:
    said attaching member primary portion has first and second ends and defines a slot extending from said first end toward said second end;
    said extension member is receivable in said attaching member slot;
    said extension member has an upper surface defining a linear channel;
    said attaching member primary portion defines a hole above said linear channel when said extension member is received in said attaching member slot; and
    a ball is positioned to extend into said hole and said linear channel.

14. The guide of claim 13 wherein:
    said hole extends through said attaching member primary portion;
    an upper portion of said hole includes threads;
    a screw is receivable in said hole;
    said screw has threads complementary to said hole threads in said upper portion;
    said screw has a lower end for abutting said ball;
    a spring is in said hole to bias said ball into said extension member linear channel;
    a lower portion of said hole includes threads;
    a retaining washer is receivable in said hole, said retaining washer having threads complementary to said lower portion threads and securing said ball in said hole; and
    said ball extends into said extension member linear channel.

15. The guide of claim 13, wherein:
a spring is in said hole to bias said ball into said extension member linear channel;
a lower portion of said hole includes threads;
a retaining washer is receivable in said hole, said retaining washer having threads complementary to said lower portion threads and securing said ball in said hole; and
said bull extends into said extension member linear channel.

16. The guide of claim 15, further comprising:
a laser; and
a switch in communication with said laser, said switch being selectively activated by said ball.

17. The guide of claim 13, further comprising:
a laser; and
a switch in communication with said laser, said switch being selectively activated by said ball.

* * * * *